March 17, 1964 W. J. HIRTREITER 3,124,962
ACCELEROMETER APPARATUS
Filed Dec. 17, 1954 2 Sheets-Sheet 1
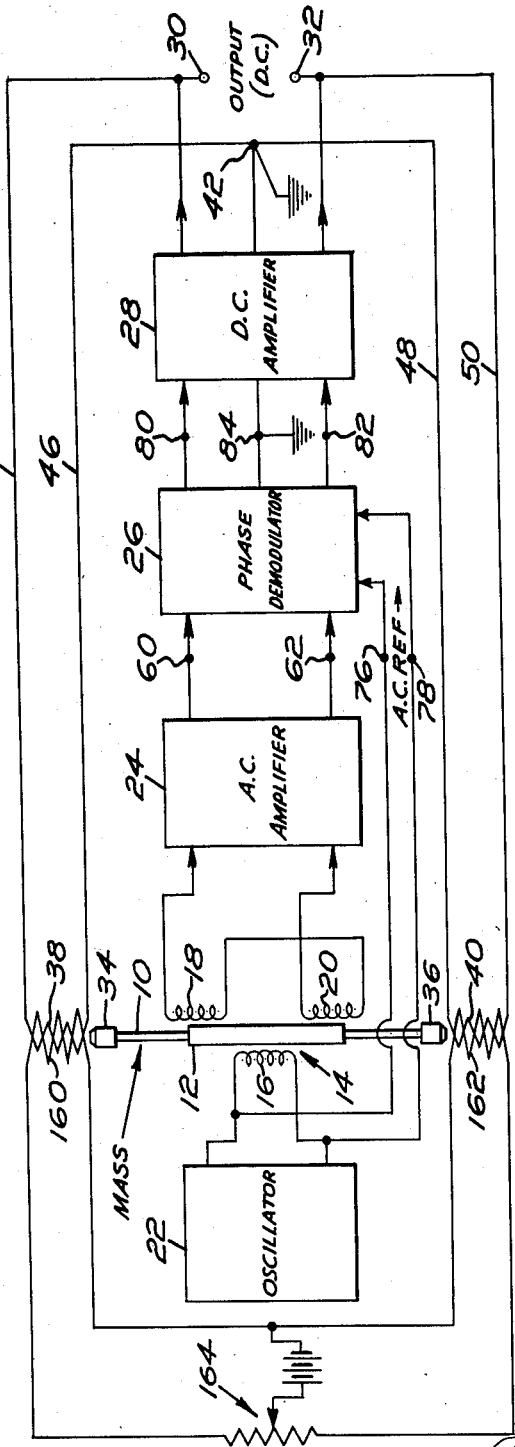
INVENTOR.
WALTER J. HIRTREITER
BY
Beau, Brooks, Buckley & Beau,
ATTORNEYS.

March 17, 1964 W. J. HIRTREITER 3,124,962
ACCELEROMETER APPARATUS
Filed Dec. 17, 1954 2 Sheets-Sheet 2
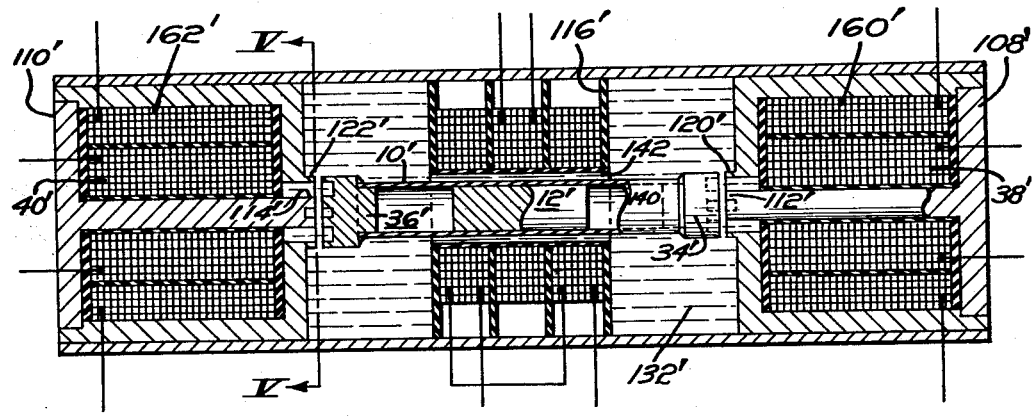
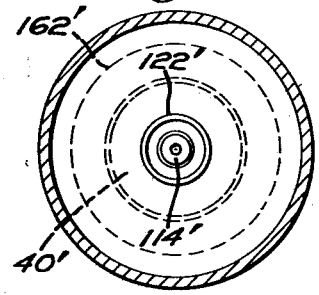
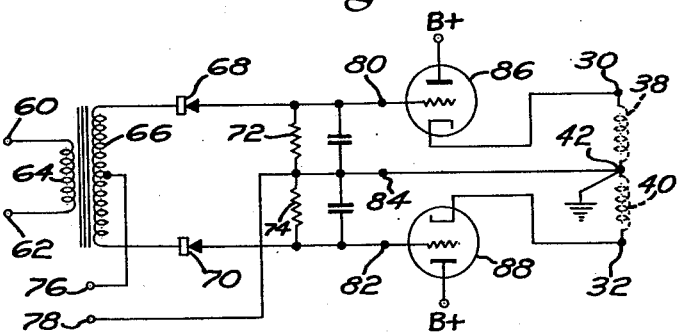
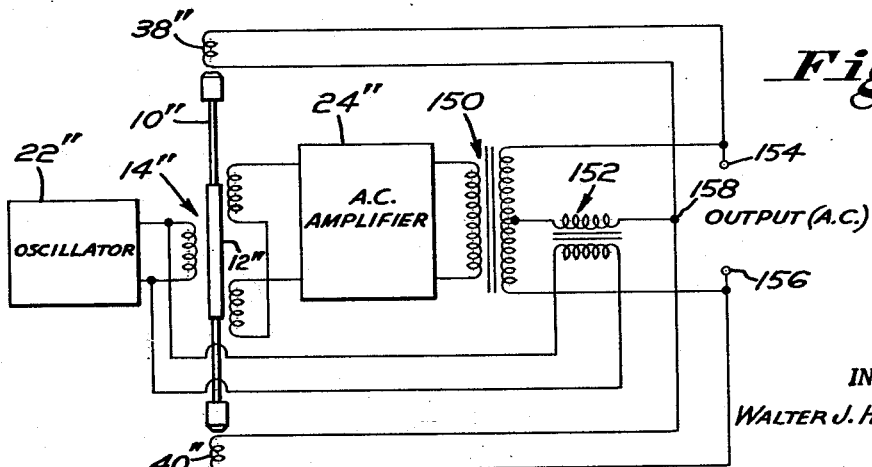
INVENTOR.
WALTER J. HIRTREITER
BY: Beau, Brooks, Buckley & Beau,
ATTORNEYS.

United States Patent Office 3,124,962
Patented Mar. 17, 1964

3,124,962
ACCELEROMETER APPARATUS
Walter J. Hirtreiter, 239 Norwalk Ave., Buffalo 16, N.Y.
Filed Dec. 17, 1954, Ser. No. 475,982
10 Claims. (Cl. 73—516)

This invention relates to the electrical instrument art and more particularly to an improved accelerometer device of the deflectable mass type having an extremely sensitive response.

Various attempts have been made to produce accelerometers of increased sensitivity and to this end various fluid suspensions have been proposed in lieu of the earlier spring type of suspensions for the deflectable mass of the accelerometer. Heretofore such fluid suspensions have been arranged to support all or most of the weight of the displaceable mass but additional expedients have been needed to position or locate the mass and to determine its path of motion. Such means have included mechanical pivots and dynamic fluid arrangements which have the disadvantage of introducing some friction or other response damping or distorting forces.

In accordance with the present invention an accelerometer is provided in which the movable mass is suspended entirely magnetically with no mechanical or fluid guides normally coming into operation, the suspension of the mass embodying biasing means urging the mass to its neutral position, thereby eliminating the springs or the like of the prior art together with the mechanical hysteresis attendant thereto. Additionally, the accelerometer is so constructed that no windings or the like are required on the movable mass.

Accordingly, the mass is entirely free of mechanical connections and therefore static friction is virtually eliminated, so that the device is sensitive to infinitesimal changes in momentum. At the same time, the suspension is so arranged that it supports the mass for purely translational motion whereby the accelerometer of the invention is selective in its response so as to be sensitive to changes in momentum in that direction of motion only.

Accordingly, a major object of the invention is to provide an accelerometer of improved sensitivity.

Another object of the invention is to provide an accelerometer as aforesaid which is sensitive to momentum components of a single predetermined direction only.

Still another object of the invention is to provide an accelerometer which is characterized by an extreme range of sensitivity and linear response throughout that range.

Another object of the invention is to provide an accelerometer as aforesaid which is of simple and compact construction.

A further object of the invention is to provide an instrument of the type described which is rugged and resistant to forces in all directions whereby the instrument is very nearly indestructible and is suitable for use in all types of installations.

Other objects of the invention will be apparent from the following description and claims and from the drawings wherein:

FIG. 1 is a schematic diagram of an accelerometer apparatus in accordance with the present invention; and FIG. 2 is a sectional view of the acceleration sensing unit of the accelerometer apparatus of FIG. 1;

FIG. 3 is a cross sectional view taken about on line III—III of FIG. 2;

FIG. 4 is a sectional view of another form of the acceleration sensing unit of the invention;

FIG. 5 is a cross-sectional view taken about on line V—V of FIG. 4;

FIG. 6 is a schematic wiring diagram of part of the circuit of FIG. 1, and

FIG. 7 is a schematic diagram of a modified form of the accelerometer apparatus of the invention.

Referring more particularly to FIG. 1 of the drawings, one preferred embodiment of the invention is illustrated and comprises a deflectable mass 10 which is magnetically mounted for longitudinal motion as will be more fully described hereinafter. Frictionless transducer means are provided to sense the position of the mass 10. Thus the mass 10 includes a core portion 12 of a differential transformer 14 arranged to provide a balanced coupling between the transformer primary 16 and differentially connected secondaries 18, 20 when in an undeflected or neutral position as shown. The primary winding 16 is excited from any suitable source such as an oscillator 22 and the differential output of the secondaries 18, 20 is preferably amplified as by an A.C. amplifier 24, which may be of conventional shock proof construction. The amplified output of the sensing unit is then demodulated or rectified by a phase demodulator 26 to provide an output which is a direct current voltage having an amplitude which is proportional to the unbalance of the coupling to the transformer secondaries 18, 20 and polarity which corresponds to the polarity or phase of the A.C. output of the transformer 14 with respect to primary exciting source 22 serving as a reference.

This rectified signal is again amplified by a D.C. amplifier 28, the output at the terminals 30, 32 of which it may be taken as the useful output of the accelerometer device, as for example for energization of a sensitive volt meter (not shown) having a scale calibrated in terms of acceleration.

Magnetic means are provided to suspend the mass 10 for acceleration sensing motion and to bias the same toward its central or neutral position. To this end, the acceleration sensing mass 10 includes armature portions 34, 36 arranged to be attracted at longitudinally spaced positions by corresponding suspension field means such as coils 38, 40 providing a nominal mass suspending magnetic field for coaction with each armature portion, modified by a feedback signal for unbalancing the suspension to urge the mass to its neutral position.

Accordingly, the phase demodulator 26 and the D.C. amplifier 28 devices of FIG. 1 are of a symmetrical or push-pull type whereby the instrument output at the terminals 30, 32 is the algebraic difference of two complex components, one of which is a D.C. function of the sum of, and the other of which is a like function of the difference of, the reference voltage and the amplified output of the differential transformer 14. These two instrument output components are available separately between the output terminals 30, 32 and the center tap or neutral terminal 42 of the push-pull system, and are connected in negative feedback relation to the suspending field coils 38, 40 of the sensing mass suspension by lines 44, 46, 48, 50 as shown.

Referring to FIG. 6, one type of phase demodulator and D.C. amplifier arrangement is illustrated, as an example only of a typical circuit arrangement suitable for use in the apparatus of FIG. 1. Referring to the figure in conjunction with FIG. 1, the output of the A.C. amplifier at terminals 60, 62 is supplied to the primary 64 of a transformer having a center tapped secondary 66. It will be understood that the primary 64 of the transformer may actually be the load impedance of the amplifier 24. A pair of rectifier elements 68, 70 are placed in a series with respective halves of the secondary 66 and respective load resistors 72, 74 across the A.C. reference voltage as supplied at terminals 76, 78. This symmetrical arrangement provides a three terminal output, terminals 80 and 82 of which are normally equally negative with respect to the center terminal 84. However, it will be seen that when a signal is applied at the terminals 60, 62, the negative voltage between one pair of terminals 80, 84 will decrease or increase according to the value of the signal at the primary 64 and its polarity relative to the reference voltage at terminals 76, 78, while the voltage between terminals 82, 84 will vary oppositely. The two negative outputs may then be connected to the control grids of a pair of tubes 86, 88 of a push-pull D.C. amplifier the load of which is the two suspension coils 38, 40 connected between the terminals 30, 32 and the common terminal 42 as shown.

Referring now to FIGS. 2 and 3 of the drawing, a sensing unit structure in accordance with the invention is illustrated, and comprises a tubular housing member 100 which mounts and encloses a coil spool structure 102 carrying the primary coil 16 and the secondary coils 18, 20 of the differential transformer 14. As shown, the secondary coils 18, 20 are arranged in flanking relation to the primary coil 16 and the transformer core element 12 is so dimensioned relative thereto that longitudinal or axial displacement of the core element from the neutral position shown will provide inverse variation of the coupling from the primary to the respective secondary coils.

The displaceable mass 10 of which the transformer core piece 12 is a part is mounted for such axial movement by the co-action of the suspension coils 38, 40 and their armature pieces 34, 36 as previously referred to, these armature members being connected to the opposite ends of the transformer core 12 by non-magnetic spacer members 104, 106. The coils 38, 40 are provided with field core structures 108, 110 each comprising a central or axial pole member 112, 114 on which the corresponding coil spool 116, 118 is mounted and an annularly returned opposite pole structure 120, 122 enclosing the coil assembly and ending in an annular return pole face 124, 126 spaced axially beyond the end of the axial pole member and forming the opposite magnetic end of the field core.

As shown, the armature members 34, 36 are of generally cylindrical shape and are normally substantially coaxial with the respective axial pole members 112, 114, extending into close face to face proximity therewith, with the return pole faces 120, 122 embracing the cylindrical armature sides with an annular gap thereabout.

It will be seen that when the coils 38, 40 are energized, the armature members 34, 36 are attracted in opposite directions by the corresponding axial poles 112, 114, the opposing axial forces being equal when the mass core portion 12 is in its neutral position as shown and being unbalanced in a restorative direction by the feedback system previously described when the mass 10 and its core portion 12 is displaced axially from that neutral position, as by the force of acceleration to be measured.

For providing lateral forces to lift and maintain the mass 10 suspended clear of the annularly surrounding structures, the magnetic circuits of the suspending fields are arranged to have minimum reluctance when the armature members are coaxial therewith as shown. To this end the opposing faces of the armatures 34, 36 and the corresponding closely proximate axial poles 112, 114 are of similar shape and size, and these opposing parts are preferably chamfered or otherwise cross-sectionally reduced as shown to provide a concentrated field at each of the axial gaps therebetween, resulting in strong lateral locating forces. There will also be lateral attractive forces between the armatures and the encircling return pole faces 124, 126, but these will be substantially purely radial in the structure shown, and will be equally distributed about the respective armatures when the same are coaxial with the annular poles 124, 126. Therefore these forces will be substantially self-cancelling under normal operating conditions. In any event, the parts are so arranged that the aligning forces provided at the axial gaps will always predominate so as to provide lateral suspension of the armatures; and to prevent the possibility of either armature "sticking" against the corresponding annular pole 124, 126 it is preferred that normally nonbearing stop means be provided to prevent too close approach of those parts to each other, as when the instrument is de-energized or when it is subjected to lateral mass deflecting force components beyond its rating. In the sensing unit structure of FIG. 2, such stops are provided by armature embracing portions 128, 130 of the coil spools 116, 118 which encircle the respective armatures with a clearance during normal operation.

While operation of the illustrated feedback circuit reduces the total magnetization in one or the other of the suspending fields for producing the aforementioned restorative action, it will be understood that this reduction need not be of a degree which will interfere with the lateral locating function of the fields during normal operation within the rating of the apparatus. On the other hand, the degree of feedback upon extreme axial displacement of the mass is preferably sufficient to reduce the field at the approached end of the unit to zero, and accordingly no longitudinal stops are needed other than the pole faces themselves. For this reason, irreversible current supply means such as shown at 86, 88 (FIG. 6) are preferred for exciting the suspension coils.

Preferably the housing 100 is of magnetic material for shielding purposes, and is filled with oil or other suitable liquid 132 in order to provide an oscillation damping dash-pot action as well as to provide partial buoyancy to the deflectable mass structure. Where desired, the connector members 104, 106 may be of hollow tubular form as shown to add to the overall buoyancy of the deflectable mass structure.

Referring now to FIG. 4, a modified embodiment of the acceleration sensing unit of the invention is shown and it will be seen that this modified embodiment is generally similar to the sensing unit shown in FIG. 2, the principal difference being that the gaps between the stationary suspension core structures of the coils 38', 40' and the cooperating suspension armature structures are entirely axial so that both gaps in each magnetic suspension are productive of axially aligning forces for location of the movable element 10'. For this purpose each coil core structure 108', 110' is formed at its opposite magnetic ends with concentric annular or ring shaped salient poles 112', 120', 114', 122' cooperating with similar annularly spaced salient pole formations on the armature members 34', 36'. This arrangement imparts a useful armature suspending function to the flux at each of the gaps and therefore permits concentration of the flux thereat across relatively narrow gaps; for example the axial gap, shown exaggerated in the drawing, may be in the order of one-tenth of the gap between the stationary pole structures 112', 120' and 114', 122'. Furthermore, the annular salient pole arrangement provides an especially strong resistance to lateral displacement of the mass 10' for a given amount of total flux. These features enable production of sufficient suspending force with much smaller magnetizing forces than in the arrangement of FIG. 2, and accordingly smaller and more compact coil exciting power elements may be used.

It will be noted that in the alternate form of deflectable mass 10' as shown in FIG. 4, the transformer core member 12' is connected to the spaced armatures 34', 36' by a tubular body member 140 which encloses the core 12' and is of substantially the same diameter as the armatures 34', 36'. This construction provides a less turbulent dash-pot action when fluid 132' is employed for this purpose, as compared to the arrangement of FIG. 2. Also, since the diameter of the tube 140 is greater than that of the tubes 104, 106 of FIG. 2, its buoyancy is greater. However in either case these tubular members may be filled, as with oil, if desired to increase the mass of the moving element 10 or 10'.

In the unit of FIG. 4, a stop or guide means for supporting the mass 10' when the apparatus is deenergized is conveniently provided by the annular wall 142 of the open ended core chamber of the differential transformer coil frame or spool structure 116'. This wall 142 will support the mass 10' by engagement with the body member 140 in such a position that the suspending fields will lift the mass to its operative position as shown when the apparatus is again energized.

While a D.C. feedback arrangement as in FIG. 1 is preferred, the circuit may be simplified where desired by the employment of A.C. feedback as shown in FIG. 7, especially where no D.C. output signal is required. It will be seen that the circuit arrangement of the differential transformer 14" excited by an oscillator 22" and operable by and upon the movement of a core member 12" incorporated in the movable mass 10" to vary the relative coupling to differentially connected secondaries, the output of which is amplified by an A.C. amplifier 24", is the same as in FIG. 1. However the feedback circuit is simplified in that the output of the amplifier is simply added to the reference voltage in a push-pull transformer arrangement 150, 152 to excite the two suspending coils 38", 40" with a quiescent voltage derived from the reference 22" plus a voltage corresponding to the output of the differential transformer. Accordingly as the movable mass is deflected in one direction or the other, the amplified output of the differential transformer will add to the excitation of one suspending coil while subtracting from that of the other to provide the desired mass displacement resisting and mass returning force to the movable element 10".

As in the arrangement of FIG. 1, either form of the sensing unit structure of the invention, as shown in FIGS. 2 and 4, may be used with the circuit of FIG. 7, it being understood that suitable shielding would preferably be added to isolate the fields of the several coils from each other.

Where desired, the magnetic suspension of the invention, whether A.C. or D.C. may embody an electric signal input arrangement such as by means of additional coils, either A.C. or D.C., contributing to the suspending field, as shown for example at 160, 162 in FIGS. 1 and 2 and at 160', 162' in FIG. 4. Such an arrangement is desirable for example for balancing out forces not desired to be measured such as the force of gravity on the deflectable mass when the same is not in a horizontal position. For example where the accelerometer is air borne it is unnecessary to provide a gyroscopic platform; the output signal of the gyroscope instead of being used to control such a platform may be simply fed to the auxiliary coils for exactly negativing the effect of gravity so that the deflectable mass is in its neutral position at zero acceleration. This general type of signal input arrangement is indicated in FIG. 1 in simplified form by the showing of a potentiometer controlled signal source 164 energizing the two auxiliary coils 160, 162 differentially according to a manual adjustment. It will be understood that this manual adjustment could be replaced by any suitable signal source such as a gyroscopic signal source.

It will be seen that the invention provides an accelerometer in which the movable mass is provided with an entirely frictionless suspension including balancing means urging the movable mass to its neutral position, by means of a dual function magnetic arrangement responsive to the position of the mass through a frictionless transducer or position sensing device. Thus the instrument is entirely free from mechanical hysteresis and other non-linearity introducing and sensitivity limiting factors of prior art devices.

Preferably the gain of the amplifier 24 or 24" is made very high, thereby holding the displacement of the movable mass to correspondingly small values by operation of the feedback system, with resulting minimization of non-linearity such as might be introduced by changed relationships of the parts at different relative positions. However it has been found that with the oppositely attracting, normally simultaneously energized magnetic suspending fields, the response of the accelerometer apparatus is substantially linear even when considerable longitudinal movement of the mass 10, 10' or 10" is permitted.

While only the shiftable core differential transformer type of transducer has been shown, it will be understood that other well known position or displacement sensing devices could be employed in the system of the present invention together with suitable circuitry for making the mass displacement information available for operation of the feedback or biasing means of the invention. So also the shape and arrangement of the suspension field defining elements are subject to variation, it being preferred however that the opposing pole faces providing the lateral locating forces be shaped to provide highly concentrated and sharply defined mass locating fields; for example such as by means of the tapered axial poles and armatures of FIG. 2 or a coaxial axially mating ring formation at one or both gaps of each suspending field as in FIG. 4.

In the illustrated forms of the acceleration sensing unit of the invention, the magnetic gap forming parts are of continuously circular cross-section, as indicated in FIGS. 3 and 5. This facilitates accurate machining of these parts so that rotation of the displaceable mass about its long axis is without effect. However should it be desired to prevent such rotation, the gap forming parts could be slotted and/or be made non-circular to provide a magnetically preferred rotational orientation of the mass, preferably with rotary movement stops arranged to locate the mass for being moved to that orientation by the flux. Accordingly, while the particular embodiments of the invention illustrated and described are preferred, it will be understood that the invention may be otherwise embodied within the spirit of the invention and the scope of the appended claims.

What is claimed is:

1. An accelerometer comprising a mass including magnetic material, a pair of spaced electromagnets coaxially disposed on opposite sides of said mass, each said electromagnet including a core and a first and second coil, a source of power, means to proportionally supply current from said power source to said first coil of said electromagnets to energize each said electromagnet to thereby suspend said mass in a neutral position between said electromagnets, said electromagnets constituting the principal supporting means for said mass, means to detect axial movements of said mass from its neutral position due to axial components of external forces acting on the mass, control means connected in circuit with each said second coil of each electromagnet, said control means being further connected to said detector means and being responsive to signals therefrom to oppositely vary the current supplied to each said second coil of each electromagnet to differentially vary the strength thereof to create an opposing magnetic force to counter said external axial force components to maintain said mass stable in its neutral position, and means connected to the control means for measuring and indicating the magnitude of the applied opposing magnetic force applied by said electromagnets.

2. A force measuring instrument comprising a mass comprising magnetic material, a pair of electromagnets coaxially disposed on opposite sides of said mass, means to energize said electromagnets for magnetically suspending said mass in an axial neutral position between said electromagnets, said electromagnets constituting the principal supporting means for said magnetic material mass, electrical control means to differentially vary the forces exerted by the electromagnets on said magnetic material mass, sensing means to detect axial movements of the mass responsive to components of external forces acting on said magnetic material mass, said sensing means being interconnected with said electrical control means to initiate the differential action of said electromagnets to thereby create an opposing magnetic force on said mass to counter the externally applied force components to maintain said mass in the neutral position, and a measuring means interconnected with said electrical control means to indicate the magnitude of the opposing magnetic force applied by said electromagnets.

3. A magnetic suspension device, comprising a pair of coaxially spaced electromagnets, an object including magnetic material suspended in coaxial alignment with and between said electromagnets, said electromagnets constituting the principal supporting means for said object, said object being free to rotate about its own axis in the suspended position, electrical means connected to said electromagnets for so adjusting the field strength of said electromagnets that, in the absence of external forces applied axially to said object, the axial resultant of the forces applied by both said electromagnets to said object is zero when said object is substantially centered between said electromagnets, means to detect axial movement of said object from its centered position due to an applied force, and means connected with said electromagnets and controlled by said detecting means to alter the field strength of each electromagnet so as to exactly counter the applied force and return said object to its centered position.

4. A magnetic suspension device for an object including magnetic material comprising a pair of coaxially spaced electromagnets, said object being freely suspended in coaxial alignment with and between said electromagnets, said electromagnets constituting the principal supporting means for said object, electrical means connected to said electromagnets for so adjusting the field strength of said magnets that, in the absence of external forces applied to said object, the axial resultant of the forces applied by both said electromagnets to said object is zero when the object is substantially centered between said electromagnets, and control means responsive to an axial movement of said object from its centered position as caused by an applied force to vary the field strength of one electromagnet oppositely to the other to substantially immediately return the object to its centered position.

5. In a magnetic suspension device, a pair of coaxially spaced electromagnets and an object containing magnetic material, means including said electromagnets for suspending said object coaxially between said electromagnets but mechanically unattached to said device so that said object is freely rotatable about its own axis, said electromagnets constituting the principal supporting means for said object, electrical means connected to said electromagnets for so adjusting the magnetic forces in said electromagnets that, in the absence of external forces or movement axially of said object between said electromagnets, the axial resultant of all magnetic forces applied to said object is zero when said object is in a neutral position between said coaxial electromagnets.

6. In a magnetic suspension device, a pair of coaxially spaced electromagnets and an object including magnetic material, means including said electromagnets for suspending said object in space coaxially between said electromagnets but mechanically unattached to said device so that said object is freely rotatable about its own axis, said electromagnets constituting the principal supporting means for said object, electrical means connected to said electromagnets for so adjusting the magnetic forces in said electromagnets that, in the absence of external forces or movement axially of said object between said electromagnets, the axial resultant of all magnetic forces applied to said object is zero when said object is in a neutral position between said coaxial electromagnets, said electromagnets and said object having physical and magnetic properties in circular axial symmetry.

7. In a magnetic suspension device, a pair of coaxially spaced electromagnets and an object including magnetic material, means including said electromagnets for suspending said object coaxially between said electromagnets but mechanically unattached to said device so that said object is freely rotatable about its own axis, said electromagnets constituting the principal supporting means for said object, electrical means connected to said electromagnets for so adjusting the magnetic forces in said electromagnets that, in the absence of external forces or movement axially of said object between said electromagnets, the axial resultant of all magnetic forces applied to said object is zero when said object is in a neutral position between said coaxial electromagnets, said electromagnets and said object having physical and magnetic properties in circular axial symmetry, a sensing device for detecting axial movement of said object in either direction from the neutral position between said coaxial electromagnets, and a detector and amplifier controlled by said sensing device capable of so automatically altering the magnetic strength of said electromagnets to provide a force in opposition to external axial forces applied to said object to maintain the suspended object at the neutral position between said electromagnets.

8. In a magnetic suspension device for suspending objects in any attitude, a body containing ferromagnetic material constituting an object to be supported, a pair of spaced electromagnets coaxially disposed on opposite sides of and spaced from said body, each electromagnet including an energizing coil, means to energize said electromagnets through said coils, means in circuit with said coils to control the energization of said electromagnets to magnetically suspend said body in a neutral positions between said electromagnets, said electromagnets constituting the principal supporting means for said body, and sensing means to detect axial movements of said body from its neutral position, due to axial components of external forces acting on the body, and to cause said control means to oppositely vary the magnetic force of each said electromagnet on the body by differentially varying the energization thereof to oppose the external force components to maintain the body in its neutral position.

9. A magnetic suspension device for an object including magnetic material comprising a pair of coaxially spaced electromagnets, said object being freely suspended in coaxial alignment with and between said electromagnets, said electromagnets constituting the principal supporting means for said object, electrical means connected to said electromagnets for so adjusting the field strength of said magnets that, in the absence of external forces applied to said object, the axial resultant of the forces applied by both said electromagnets to said object is zero when the object is substantially centered between said electromagnets, and control means responsive to an axial movement of said object from its centered position as caused by an applied force to vary the field strength of one electromagnet oppositely to the other to substantially immediately return the object to its centered position, said object being immersed in liquid whereby axial movements thereof are damped.

10. In a magnetic suspension device, a pair of coaxially spaced electromagnets and an object containing magnetic material, means including said electromagnets for suspending said object coaxially between said electromagnets but mechanically unattached to said device so that said object is freely rotatable about its own axis, said electromagnets constituting the principal supporting means for said object, electrical means connected to said electromagnets for so adjusting the magnetic forces in said electromagnets that, in the absence of external forces or movement axially of said object between said electromagnets, the axial resultant of all magnetic forces applied to said object is zero when said object is in a neutral position between said coaxial electromagnets, and means for damping axial movements of said object.

References Cited in the file of this patent

UNITED STATES PATENTS

| | | |
|---|---|---|
| 588,666 | Stanley et al. | Aug. 24, 1897 |
| 1,589,039 | Anschutz-Kaempfe | June 15, 1926 |
| 2,570,672 | Hathaway | Oct. 9, 1951 |
| 2,591,921 | Cosgriff et al. | Apr. 8, 1952 |
| 2,691,306 | Beams et al. | Oct. 12, 1954 |
| 2,695,165 | Hansen | Nov. 23, 1954 |
| 2,713,523 | Medicus | July 19, 1955 |
| 2,797,912 | Trostler | July 2, 1957 |

FOREIGN PATENTS

| | | |
|---|---|---|
| 23,991 | Great Britain | Nov. 7, 1904 |
| 539,409 | Great Britain | Sept. 9, 1941 |